US012433549B1

(12) United States Patent
Bazard et al.

(10) Patent No.: US 12,433,549 B1
(45) Date of Patent: Oct. 7, 2025

(54) MOLECULAR IMAGING OF THE COCHLEA

(71) Applicants: University of South Florida, Tampa, FL (US); H. Lee Moffitt Cancer Center and Research Institute, Inc., Tampa, FL (US)

(72) Inventors: Parveen Bazard, Tampa, FL (US); Mikalai Budzevich, Tampa, FL (US); Xiaoxia Zhu, Tampa, FL (US); Bo Ding, Tampa, FL (US); Robert Dana Frisina, Tampa, FL (US)

(73) Assignees: University of South Florida, Tampa, FL (US); H. Lee Moffitt Cancer Center and Research Institute, Inc., Tampa, FL (US)

( * ) Notice: Subject to any disclaimer, the term of this patent is extended or adjusted under 35 U.S.C. 154(b) by 65 days.

(21) Appl. No.: 18/426,829

(22) Filed: Jan. 30, 2024

Related U.S. Application Data

(60) Provisional application No. 63/482,079, filed on Jan. 30, 2023.

(51) Int. Cl.
*A61B 6/03* (2006.01)
*A61B 5/055* (2006.01)
*A61B 6/50* (2024.01)
*A61K 31/573* (2006.01)
*A61K 51/12* (2006.01)

(52) U.S. Cl.
CPC .............. *A61B 6/037* (2013.01); *A61B 5/055* (2013.01); *A61B 6/50* (2013.01); *A61K 31/573* (2013.01); *A61K 51/121* (2013.01)

(58) Field of Classification Search
CPC ........ A61B 5/055; A61B 6/037; G01R 33/44; G01R 33/46; G01R 33/485
See application file for complete search history.

(56) References Cited

U.S. PATENT DOCUMENTS

| | | | |
|---|---|---|---|
| 2014/0193336 A1* | 7/2014 | Rousso | A61B 6/503 600/431 |
| 2020/0268260 A1* | 8/2020 | Tran | A61B 1/00194 |
| 2024/0066099 A1* | 2/2024 | Anderson | A61K 9/06 |
| 2024/0130896 A1* | 4/2024 | Dueck | A61B 1/313 |
| 2024/0366105 A1* | 11/2024 | Dueck | A61M 5/14276 |

OTHER PUBLICATIONS

Bazard, P. et al. Roles of Key Ion Channels and Transport Proteins in Age-Related Hearing Loss. International Journal of Molecular Sciences. 2021;22:6158.

(Continued)

*Primary Examiner* — Carolyn A Pehlke
(74) *Attorney, Agent, or Firm* — Shumaker, Loop & Kendrick, LLP

(57) ABSTRACT

A novel method of measuring endocochlear potential and cochlear function in a patient is presented. The method uses nuclear imaging, such as PET or SPECT, with a radiotracer such as $^{201}$Tl to visualize any potassium ion loss in the cochlea of the patient which can contribute to auditory disorders such as hearing loss. This non-invasive technique represents a new method for auditory diagnoses by measurement of cochlear properties which can aid in the development of new therapeutics for auditory disorders.

19 Claims, 6 Drawing Sheets

(56) References Cited

OTHER PUBLICATIONS

Wangemann, P. K+ cycling and the endocochlear potential. Hearing Research. 2002; 165:1-9.
Schuknecht, H. and Gacek, M.R. Cochlear Pathology in Presbycusis. Annals of Otology, Rhinology & Laryngology. 1993;102:1-16.
Gates, G.A et al. Effects of age on the distortion product otoacoustic emission growth functions. Hearing Research. 2002;163:53-60.
Gates, G.A. and Mills, J.H. Presbycusis. The Lancet. 2005;366:1111-1120.
Weidong, L. et. Effects of high intensity impulse noise on ionic concentrations in cochlear endolymph of the guinea pig. Chin Med J (Engl). 1997;110:883-886.
Ma, Y.L. et al. Combined effects of adrenalectomy and noise exposure on compound action potentials, endocochlear potentials and endolymphatic potassium concentrations. Hearing Research. 1995;91:79-86.
Bhattacharyya, Tk.. and Dayal, V.S. Age-Related Cochlear Hair Cell Loss in the Chinchilla. The Annals of otology, rhinology, and laryngology. 1985;94:75-80.
Bhattacharyya, T.K. and Dayal, V.S. Influence of age on hair cell loss in the rabbit cochlea. Hearing Research. 1989;40:179-183.
Lang, H. et al. Endocochlear Potentials and Compound Action Potential Recovery: Functions in the C57BL/6J Mouse. Hearing Research. 2002; 172:118-126.
Ohlemiller, K.K. Divergent Aging Characteristics in CBA/J and CBA/CaJ Mouse Cochleae. Journal of the Association for Research in Otolaryngology. 2010;11:605-623.
Pike, V.W. PET Radiotracers: Crossing the Blood-Brain Barrier and Surviving Metabolism. Trends in Pharmacological Sciences. 2009;30:431-440.
Krahwinkel, W. et al. Pharmacokinetics of Thallium-201 in Normal Individuals After Routine Myocardial Scintigraphy. The Journal of Nuclear Medicine. 1988;29:1582-1586.

Manabe, O. et al. Radiopharmaceutical Tracers for Cardiac Imaging. Journal of Nuclear Cardiology. 2018;25:1204-1236.
Strauss, H.W. et al. Thallium-201 for Myocardial Imaging. Relation of Thallium-201 to Regional Myocardial Perfusion. Circulation. 1975;51:641-645.
Atkins, H.L. et al. Thallium-201 for Medical Use. Part 3: Human Distribution and Physical Imaging Properties. Journal of Nuclear Medicine. 1977;18:133-140.
Washiyama, K. et al. Biological safety of nasal thallium-201 administration: a preclinical study for olfacto-scintigraphy. Journal of Radiation Research. 2011;52:450-455.
Schmalhofer, W.A. et al. A Pharmacologically Validated, High-Capacity, Functional Thallium Flux Assay for the Human Ether-à-go-go Related Gene Potassium Channel. Assay and Drug Development Technologies. 2010;8:714-726.
Zhang, D. et al. A Thallium Transport FLIPR-Based Assay for the Identification of KCC2-Positive Modulators. Journal of Biomolecular Screening. 2010;15:177-184.
Ding, B. et al. Direct control of Na+—K+-2Cl-—cotransport protein (NKCC1) expression with aldosterone. American Journal of Physiology—Cell Physiology. 2014;306:C66-C75.
Nin, F. et al. The endocochlear potential depends on two K+ diffusion potentials and an electrical barrier in the stria vascularis of the inner ear. Proceedings of National Academy of Sciences. 2008;105:1751-1756.
Schmiedt, R.A. et al. Ouabain application to the round window of the gerbil cochlea: a model of auditory neuropathy and apoptosis. Journal of the Association for Research in Otolaryngology. 2002;3:223-233.
Higashiyama, K. et al. Bumetanide-induced enlargement of the intercellular space in the stria vascularis critically depends on Na+ transport. Hearing Research. 2003;186:1-9.
Kusakari, J. et al. Reduction of the Endocochlear Potential by the New "Loop" Diuretic, Bumetanide. Acta Oto-Laryngologica. 1978;86:336-341.

\* cited by examiner

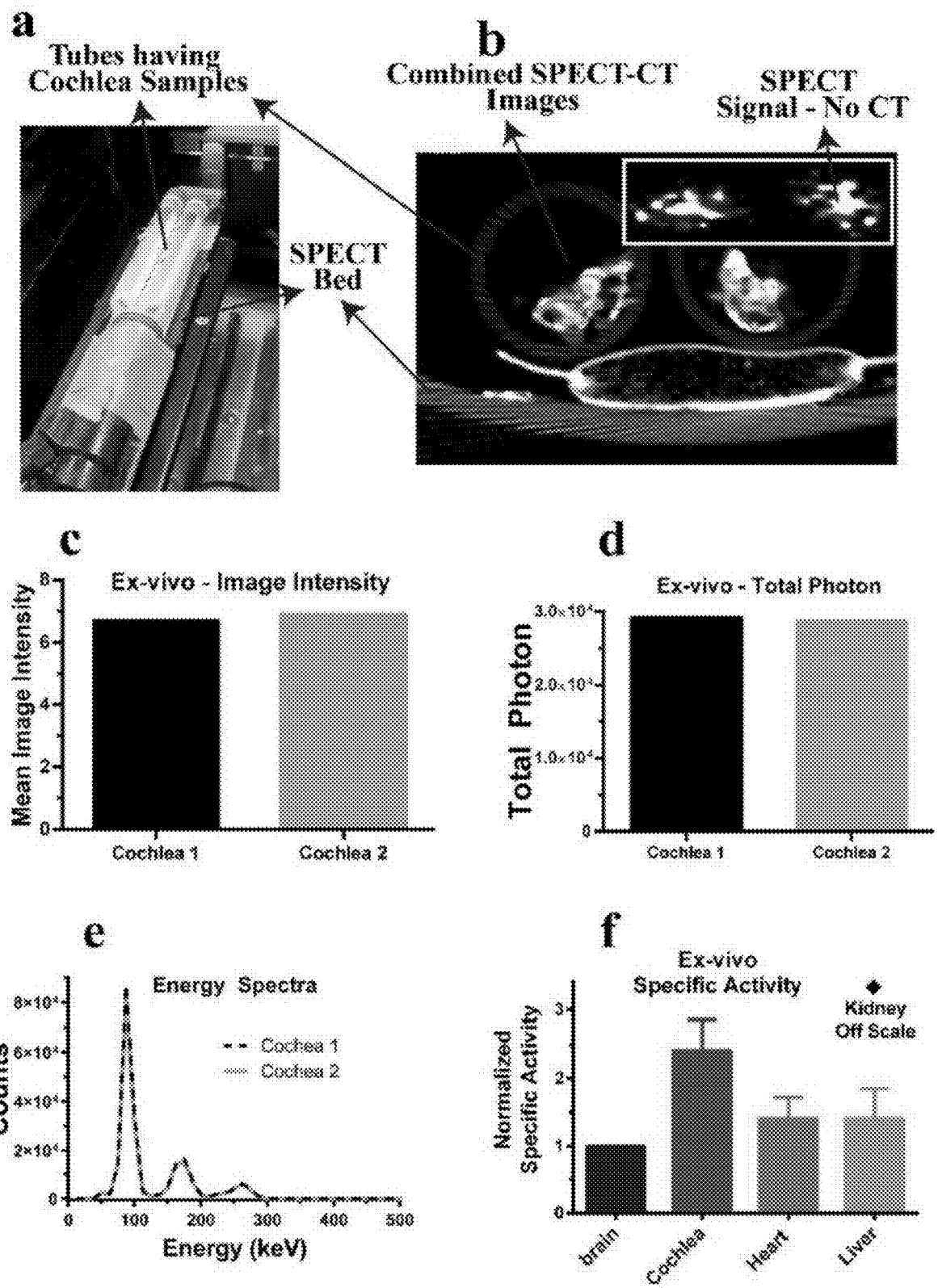
Figure 6A-F

MOLECULAR IMAGING OF THE COCHLEA

CROSS REFERENCE TO RELATED APPLICATIONS

This application is a nonprovisional of and claims priority to U.S. Provisional Patent Application Ser. No. 63/482,079, entitled "Molecular Imaging of the Cochlea", filed Jan. 30, 2023, the contents of which are hereby incorporated by reference into this disclosure.

GOVERNMENT SUPPORT

This invention was made with Government support under Grant No. DC020091 and AG009524 awarded by the National Institutes of Health. The Government has certain rights in the invention.

FIELD OF INVENTION

This invention relates to methods of measuring the physiological health of the inner ear. Specifically, the invention provides a novel non-invasive imaging method capable of measuring cochlear properties.

BACKGROUND OF THE INVENTION

The endocochlear potential (EP) is generated by the high $K^+$ concentration fluid, known as endolymph, in the scala media cochlear compartment, and is crucial for the proper transduction of sounds into the code of the nervous system for hearing[1-3]. The role of the EP in hearing pathologies for humans remains unclear. For instance, it has been described that the atrophy of the stria vascularis (SV) in the cochlear lateral wall is a prominent lesion in the temporal bones of elderly humans, but SV-linked EP changes as a predominant cause of age-related hearing loss is yet to be established[4-6]. Animal studies have mixed results[7-12]. Hence, measuring EP clinically is important, but unfortunately, there is no method available. It is not possible to measure the EP post-mortem, i.e., the EP drops to zero immediately upon death. In laboratory animal models, the EP and $K^+$ measurement techniques are invasive and terminal. These procedures involve a micro-surgical approach to get access to the inner ear in an anesthetized animal[7,12]. Therefore, a new non-invasive method is critical to explore the scala media endolymph system clinically.

Nuclear medicine uses radioactive isotopes in a variety of ways. The use of suitable isotopes combined with SPECT/PET is widely accepted as a valuable clinical research methodology. The radioisotope can circulate throughout the body and/or can be taken up by only certain specific tissues. Its distribution can be tracked according to the radiation emitted. This emitted radiation can be captured by various imaging techniques, such as single photon emission computed tomography (SPECT) or positron emission tomography (PET), depending on the type of radioisotope used. Through such imaging, researchers and physicians, for example, are able to examine organ and tumor morphology and function in great detail. Indeed, the use of radioisotopes in the fields of nuclear medicine and radiotherapy has advanced significantly.

Nuclear and molecular imaging techniques are widely used to study biological processes in organs, such as the thyroid, heart, and brain. However, these methods have not been used for cochlear imaging. The inventors have shown cochlear imaging is possible using innovative nuclear and molecular imaging techniques. As scala media (middle compartment of the cochlea) has a high $K^+$ concentration, a radiopharmaceutical analog of $K^+$, is a good candidate for this purpose. Accordingly, $^{201}Tl$—a well-known clinically used $K^+$ analogue, was used to image the inner ear of young adult CBA/CaJ mice in combination with SPECT. $^{201}Tl$ is monovalent like $K^+$ and has similar ionic radii, so, it can exchange with $K^+$ readily[13-16].

Given the lack of methods to determine endocochlear potential (EP), what is needed are non-invasive methods capable of exploring the scala media endolymph to determine EP and cochlear function.

SUMMARY OF INVENTION

There is no clinical method currently available to measure the inner ear's battery, also known as the endocochlear potential (EP), in vivo without permanent cochlear and hearing damage. Auditory Brainstem Responses (ABRs) and Distortion Product Otoacoustic Emissions (DPOAEs) are physiological measurements of different aspects of cochlear health; however, there is no direct measurement to visualize the functioning of a key component of the cochlea, the stria vascularis, i.e., there is no non-invasive physiological measure, which can also be used clinically to measure stria function. The stria produces the endolymph of scala media-a unique potassium-rich solution required for hearing. Declines in the scala media potassium concentration, which can produce decreases in the cochlear physiological battery, cause hearing loss. Evidence suggests that strial problems are involved in the main types of hearing loss, including age-related, noise-induced, and chemical-induced (cisplatin, antibiotics).

Here, the inventors used molecular/nuclear imaging techniques with Thallium-201 ($^{201}Tl$) as the tracer to image the potassium ($K^+$) concentration, which is proportional to EP, in the scala media. The scala media's $K^+$ and $^{201}Tl$ exchange are facilitated by the structures within the stria vascularis (SV), a vascularized tissue in the cochlear lateral wall. The method determines the role of the EP in human hearing loss, including aging auditory deficits. The inventors used 201Tl as the radiotracer with Single Photon Emission Computed Tomography (SPECT) imaging to visualize the $K^+$ levels in the inner ear of CBA/CaJ mice. Initial phantom experiments were conducted, followed by in vivo and ex vivo imaging. The inventors found that SPECT-CT imaging, in combination with a radiotracer, can quantify inner ear biological processes thus opening up new diagnostic and clinical avenues for various hearing disorders, including age-related and noise-induced hearing loss.

In an embodiment, a method of measuring endocochlear potential (EP) in a patient in need thereof is presented comprising administering a therapeutically effective amount of at least one radiotracer to a patient; performing nuclear imaging on the cochlea of the patient; measuring a level of radiation signals emitting from the at least one radiotracer wherein the level of the radiation signals is proportional to, or otherwise correlates to, a level of potassium ion concentration in the cochlea of the patient; and comparing the level of potassium ion concentration in the cochlea of the patient as measured by the radiation signals to a level of potassium ion concentration of a normal control wherein a decrease in the level of the potassium ion concentration in the cochlea of the patient as measured by the radiation signals as compared to the level of potassium ion concentration in the normal control indicates a decrease in EP. The method further comprises administering a therapeutic agent to increase potassium ion concentration levels in the cochlea or administering a composition containing aldosterone or derivatives thereof. In some embodiments, where a sodium analog or a combination of sodium and potassium analogs is used as the radiotracer, the ratio of the potassium-to-sodium concentration may be calculated and used to determine the level of potassium ion concentration in the cochlea of the patient.

The nuclear imaging may be emission imaging. The nuclear imaging may be positron emission tomography (PET), magnetic resonance imaging (MRI), or single-photon emission computerized tomography (SPECT). The radiotracer may be a potassium analog, a sodium analog, or a combination thereof. The radiotracer may be selected from the group consisting of thallium-201 ($^{201}$Tl), rubidium-82 ($^{82}$Rb), potassium-43 ($^{43}$K$^{+}$), rubidium-86 ($^{86}$Rb), sodium-22 ($^{22}$Na), and cesium-129 ($^{129}$Cs). In some embodiments, the radiotracer is thallium-201 ($^{201}$Tl).

In another embodiment, a method of determining cochlear function in a patient is presented comprising administering a therapeutically effective amount of a radiotracer to the patient wherein the at least one radiotracer is a potassium analog, a sodium analog, or combinations thereof; performing a nuclear imaging procedure on the cochlea of the patient; measuring a level of radiation signals emitting from the at least one radiotracer wherein the level of the radiation signals measured in the cochlea of the patient correlates to a level of potassium ion concentration or a level of sodium ion concentration in the cochlea of the patient; and comparing the level of potassium ion concentration or the level of sodium ion concentration in the cochlea of the patient as measured by the radiation signals to a level of potassium ion concentration or sodium ion concentration of a normal control wherein a decrease in the level of the potassium ion concentration or an increase in the level of sodium ion concentration in the cochlea of the patient as measured by the radiation signals as compared to the level of potassium ion concentration or the level of sodium ion concentration in the normal control indicates a decrease in cochlear function. In some embodiments, where a sodium analog or a combination of sodium and potassium analogs is used as the radiotracer, the ratio of the potassium-to-sodium concentration may be calculated and used to determine the level of potassium ion concentration in the cochlea of the patient.

The nuclear imaging may be emission imaging. In some embodiments, the nuclear imaging may be positron emission tomography (PET), magnetic resonance imaging (MRI), or single-photon emission computerized tomography (SPECT). The radiotracer may be selected from the group consisting of thallium-201 ($^{201}$Tl), rubidium-82 ($^{82}$Rb), potassium-43 ($^{43}$K$^{+}$), rubidium-86 ($^{86}$Rb), sodium-22 ($^{22}$Na), and cesium-129 ($^{129}$Cs). In some embodiments, the radiotracer is thallium-201 ($^{201}$Tl).

In a further embodiment, a method of diagnosing and treating an auditory disorder in a patient is presented comprising: administering a therapeutically effective amount of at least one radiotracer to a patient; performing a nuclear imaging procedure on an inner ear of the patient; measuring a level of radiation signals emitting from the at least one radiotracer wherein the level of the radiation signals measured in the inner ear of the patient is proportional to, or otherwise correlates to, a level of potassium ion concentration in a cochlea of the inner ear of the patient; comparing the level of the potassium ion concentration in the inner ear of the patient as measured by the radiation signals to a level of potassium ion concentration of a normal control wherein a decrease in the level of the potassium ion concentration in the inner ear of the patient as compared to the normal control indicates an auditory disorder; and administering a therapeutically effective amount of a therapeutic agent to the patient wherein the therapeutic agent increases the level of potassium ion concentration in the inner ear of the patient. In some embodiments, a composition comprising aldosterone or its derivatives may be administered as the sole therapeutic agent or in addition to another therapeutic agent such as a potassium channel agonist.

The nuclear imaging may be emission imaging. In some embodiments, the nuclear imaging may be positron emission tomography (PET), magnetic resonance imaging (MRI), or single-photon emission computerized tomography (SPECT). The radiotracer may be a potassium analog, a sodium analog, or combinations thereof. The radiotracer may be selected from the group consisting of thallium-201 ($^{201}$Tl), rubidium-82 ($^{82}$Rb), potassium-43 ($^{43}$K$^{+}$), rubidium-86 ($^{86}$Rb), sodium-22 ($^{22}$Na), and cesium-129 ($^{129}$Cs). In some embodiments, the radiotracer is thallium-201 ($^{201}$Tl). In some embodiments, where a sodium analog or a combination of sodium and potassium analogs is used as the radiotracer, the ratio of the potassium-to-sodium concentration may be calculated and used to determine the level of potassium ion concentration in the cochlea of the patient.

BRIEF DESCRIPTION OF THE DRAWINGS

For a fuller understanding of the invention, reference should be made to the following detailed description, taken in connection with the accompanying drawings, in which:

FIG. 6A-F is a series of images depicting ex vivo experiments. a) A pair of cochleae (one in each tube), dissected from an animal, were imaged—SPECT+CT. b) SPECT and CT combined image of both cochleae. Inset shows the SPECT only (no CT) image. The SPECT signal was the same from both cochleae; c) mean image intensity and d) total photon counts; e) Energy spectra measured using gamma spectroscopy was also the same for both cochleae; with the main peak around 68 KeV—peak of $^{201}$Tl spectra. f) Animals were dissected after the experiments and radioactivity was measured from various body organs. The signal was normalized to the brain activity level. The cochlea signal was the highest among the all the organs, except kidney, was the highest.

DETAILED DESCRIPTION OF THE PREFERRED EMBODIMENT

Figure 1:
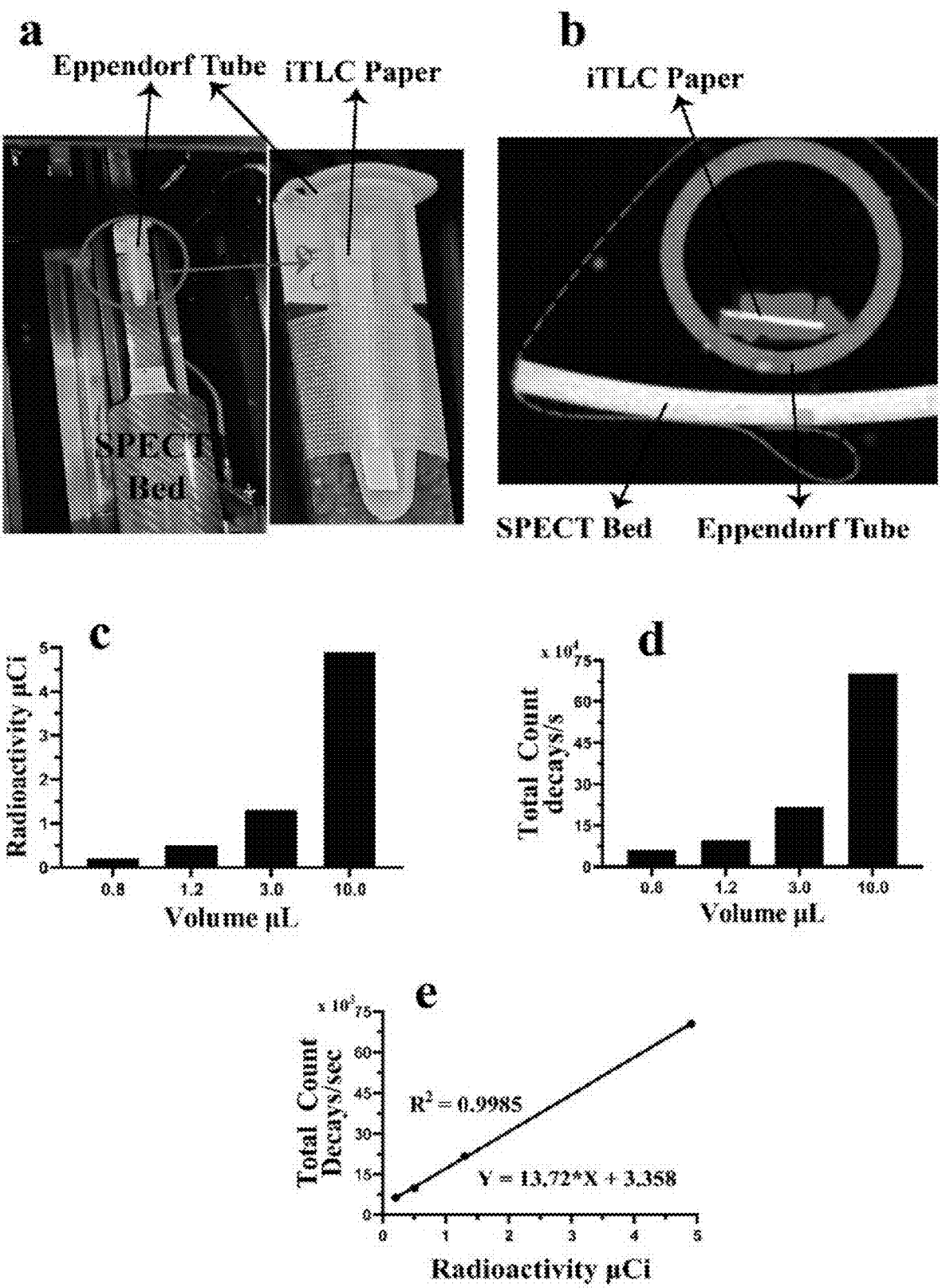
FIG. 1A-E is a series of images depicting the in vitro Phantom Experiments. a) an instant thin layer chromatography (iTLC) paper having a fixed volume of Thallium-201 ($^{201}$Tl) solution in an Eppendorf tube was used as the phantom. Four volumes were used for the phantom experiments: 0.8 µL~mouse cochlear volume, 1.2 µL~guinea pig scala media volume, 3.0 µL~rat cochlear volume and 10.0 µL~guinea pig cochlear volume; b) A representative SPECT image of a phantom experiment showing the iTLC paper in an Eppendorf tube. c) Radioactivity of four phantoms, measured using gamma spectroscopy. d) Total photon counts from the SPECT images. e) Radioactivity (gamma spectroscopy) vs total count (SPECT imaging), indicating the sensitivity of phantom experiments. Linear regression was fitted between these two parameters.

In the following detailed description of the preferred embodiments, reference is made to the accompanying drawings, which form a part hereof, and within which are shown by way of illustration specific embodiments by which the invention may be practiced. It is to be understood that other embodiments may be utilized, and structural changes may be made without departing from the scope of the invention.

Definitions

Unless otherwise defined, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are described herein. All publications mentioned herein are incorporated herein by reference in their entirety to disclose and describe the methods and/or materials in connection with which the publications are cited. It is understood that the present disclosure supercedes any disclosure of an incorporated publication to the extent there is a contradiction.

As used herein, the singular forms "a," "an" and "the" include plural referents unless the context clearly dictates otherwise. For example, "a nanoparticle" includes "nanoparticles" or "plurality of nanoparticles".

As used in this specification and the appended claims, the term "or" is generally employed in its sense including "and/or" unless the context clearly dictates otherwise.

All numerical designations, such as pH, temperature, time, concentration, and molecular weight, including ranges, are approximations which are varied up or down by increments of 1.0, 0.1, 0.01 or 0.001 as appropriate. It is to be understood, even if it is not always explicitly stated that all numerical designations are preceded by the term "about". It is also to be understood, even if it is not always explicitly stated, that the reagents described herein are merely exemplary and that equivalents of such are known in the art and can be substituted for the reagents explicitly stated herein.

Concentrations, amounts, solubilities, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include the individual values and sub-ranges within the indicated range. Thus, included in this numerical range are individual values such as 2, 3, and 4 and sub-ranges such as from 1-3, from 2-4 and from 3-5, etc. This same principle applies to ranges reciting only one numerical value. Furthermore, such an interpretation should apply regardless of the range or the characteristics being described.

As used herein, the term "comprising" is intended to mean that the products, compositions, and methods include the referenced components or steps, but not excluding others. "Consisting essentially of" when used to define products, compositions, and methods, shall mean excluding other components or steps of any essential significance. Thus, a composition consisting essentially of the recited components would not exclude trace contaminants and pharmaceutically acceptable carriers. "Consisting of" shall mean excluding more than trace elements of other components or steps.

As used herein, "about" means approximately or nearly and in the context of a numerical value or range set forth means ±10% of the numerical.

As used herein "patient" is used to describe a mammal, preferably a human, to whom treatment is administered, including prophylactic treatment with the compositions of the present invention. Non-limiting examples of mammals include humans, rodents, aquatic mammals, domestic animals such as dogs and cats, farm animals such as sheep, pigs, cows and horses. "Patient" and "subject" are used interchangeably herein.

"Administering" or "administration" as used herein refers to the process by which the compositions of the present invention are delivered to the patient. The compositions may be administered in various ways, including but not limited to, orally, nasally, and parenterally.

"Parenteral administration" as used herein refers to modes of administration other than enteral and topical administration, usually by injection, and includes, but is not limited to, intravenous, intramuscular, intraarterial, intrathecal, intracapsular, intraorbital, intracardiac, intradermal, intraperitoneal, transtracheal, subcutaneous, subcuticular, intra-articular, subcapsular, intrathecal, intraventricular, intracisternal, intranigral, subarachnoid, intraspinal, and intrasternal injection and infusion. Dosing can be by any suitable route, e.g., by injections, such as intravenous or subcutaneous injections, depending in part on whether the administration is brief or chronic. In some embodiments, the administration of the radiotracer is by intravenous or intraarterial injection.

A "therapeutically effective amount" as used herein is defined as concentrations or amounts of components which are sufficient to effect beneficial or desired clinical results, including, but not limited to, any one or more of treating symptoms of an auditory disorder, particularly hearing loss and preventing an auditory disorder, particularly hearing loss. Compositions of the present invention can be used to effect a favorable change in the condition whether that change is an improvement, such as stopping, reversing, or reducing hearing loss, or a complete elimination of symptoms due to hearing loss. In accordance with the present invention, a suitable single dose size is a dose that is capable of preventing or alleviating (reducing or eliminating) a symptom in a patient when administered one or more times over a suitable time period. One of skill in the art can readily determine appropriate single dose sizes for systemic administration based on the size of the animal and the route of administration. The dose may be adjusted according to response. With reference to administration of radiotracers, a therapeutically effective amount refers to the minimum amount of radiotracer required to produce a signal thus enabling the effective visualization of the region of interest, such as the inner ear and cochlea. The minimum amount may be calculated by one of skill in the art taking into consideration such variables as the size of the patient and the specific radiotracer used. In some embodiments, the radiotracer may be administered in a carrier, such as a nanoparticle, to increase biocompatibility.

A "therapeutic agent" as used herein refers to a substance, composition, compound, chemical, component or extract that has measurable specified or selective physiological activity when administered to an individual in a therapeutically effective amount. In some embodiments, the therapeutic agent may be a compound or composition that increases potassium levels in the cochlea. Examples of therapeutic agents as used in the present invention include, but are not limited to, potassium channel agonists. In some embodiments, the therapeutic agent is steroid hormone including, but not limited to, aldosterone and derivatives thereof. In some embodiments, the therapeutic agent is aldosterone or derivatives thereof in combination with an anti-inflammatory drug and optionally ammonium chloride. Anti-inflammatory drugs include, but are not limited to, non-steroidal anti-inflammatory drugs such as naproxen, salicylic acid, ibuprofen, diflurophenyl salicylate derivatives, salicylsalicylic acid, sodium salicylate, salicyclamide, sodium thiosalicylate, choline salicylate, magnesium salicylate, and choline-magnesium salicylate, phenylbutazone, oxyphenylbutazone, antipyrine, aminopyrine, apazone, indomethacin, sulindac, phenacetin, acetaminophen, mefenamic, meclofenamic, flufenamic, mefenomic, ectofenamic, tolmectin, flurbioprofen, fenoprofen, ketoprofen, fenbufen, pirprofen, oxaprozin, or indoprofen. In instances where human dosages for compounds have been established for at least some condition, those same dosages may be used, or dosages that are between about 0.1% and 500%, more preferably, between about 25% and 250% of the established human dosage. Where no human dosage is established, as will be the case for newly-discovered pharmaceutical compositions, a suitable human dosage can be inferred from $ED_{50}$ or $ID_{50}$ values, or other appropriate values derived from in vitro or in vivo studies, as qualified by toxicity studies and efficacy studies in animals. In some embodiments, the therapeutic agent may be encapsulated in a carrier, such as a nanoparticle, to increase bioavailability.

"Prevention" or "preventing" or "prophylactic treatment" as used herein refers to any of: halting the effects of an auditory disorder causing decreased hearing/hearing loss, reducing the effects of decreased hearing/hearing loss, reducing the incidence of decreased hearing/hearing loss, reducing the development of decreased hearing/hearing loss, delaying the onset of symptoms of decreased hearing/hearing loss, increasing the time to onset of symptoms of decreased hearing/hearing loss, and reducing the risk of development of decreased hearing/hearing loss. In some embodiments, the decreased hearing/hearing loss is caused by decreased EP.

"Treatment" or "treating" as used herein refers to any of the alleviation, amelioration, elimination and/or stabilization of a symptom, as well as delay in progression of a symptom of a particular disorder. For example, "treatment" of an auditory disorder causing decreased hearing/hearing loss may include any one or more of the following: amelioration and/or elimination of one or more symptoms associated with decreased hearing/hearing loss, reduction of one or more symptoms of decreased hearing/hearing loss, stabilization of symptoms of decreased hearing/hearing loss, and delay in progression of one or more symptoms of decreased hearing/hearing loss. In some embodiments, the decreased hearing/hearing loss is caused by decreased EP.

The term "normal" or "control" as used herein refers to a sample assessed as not having hearing loss or any other auditory disorder. In some instances the control is the standard level known in the art. In some embodiments, the control level of potassium ion concentration in the cochlea is about 150 mM.

"Radiotracer" as used herein refers to a chemical compound, usually a synthetic derivative of a natural compound, in which one or more atoms have been replaced with a radioisotope. In some embodiments, the radiotracer is physiologically analogous to potassium or sodium. Exemplary radiotracers include, but are not limited to, thallium-201 ($^{201}$Tl), rubidium-82 ($^{82}$Rb), potassium-43 ($^{43}$K$^{+}$), rubidium-86 ($^{86}$Rb), sodium-22 ($^{22}$Na), and cesium-129 ($^{129}$Cs). In some embodiments, the radiotracer is $^{201}$Tl. While $^{201}$Tl is used in the examples, other radiotracers are contemplated including those developed in the future.

"Molecular imaging" or "nuclear imaging" as used herein refers to a medical imaging technique using radiotracers to create images and assess bodily functions and to diagnose and treat disease. In some embodiments, the molecular imaging is combined with other modalities, such as magnetic resonance imaging (MRI) or computed tomography (CT). In some embodiments, the molecular imaging used detects gamma rays such as in positron emission tomography (PET) or single-photon emission computed tomography (SPECT). In some embodiments, MRI is used as the molecular imaging.

As noted previously, there is no non-invasive physiological measure that can be used clinically to measure stria function. Decreases in the scala media potassium concentration of the cochlea can produce decreases in the cochlear physiological battery to cause hearing loss given that strial problems are implicated in the main types of hearing loss. Molecular imaging, also known as nuclear imaging, utilizes a suitable radiotracer to quantify biological functions inside the body. Here, the inventors used a state-of-the-art imaging technique—single-photon emission computerized tomography (SPECT) to image the inner ear of young adult CBA/CaJ mice. Thallium-201 ($^{201}$Tl)—a radiotracer analogous to potassium physiologically, was used as the radiotracer, as the cochlear scala media is unusually rich in potassium (~150 mM), relative to normal extracellular fluids.

The detectable radiation signals (SPECT imaging as well as gamma spectroscopy) were observed from four phantom volumes used in the experiments: 0.8 μL~mouse cochlea, 1.2 μL~guinea pig scala media, 3.0 μL~rat cochlear and 10.0 μL~guinea pig cochlea. Both SPECT signals and radioactivity levels increased as the phantom volume increased and there was a linear relation between these two quantities. SPECT $^{201}$Tl signals were observed from the mouse cochlea in-vivo, indicating that 201Tl can enter the bony cochlea structure and can be measured with a potassium ion analogue radiotracer. Regions of Interest (ROI) were drawn with the help of the CT structural images. Average cochlear signals were among the strongest as compared to any other body region, and about two times that of the brain signal.

Maximum 201Tl accumulation was observed in the kidney, consistent with previous literature. Ex-vivo experiments further confirmed the in-vivo findings. Radioactivity signals (measured using gamma spectroscopy) were measured from various body tissues; and the cochlear signals were 2.2 times that of the brain. A pair of cochleae from an animal were dissected and SPECT-CT imaging was performed. No difference was observed between the two cochleae, indicating the equal absorption of $^{201}$Tl on both sides of the peripheral auditory system. These results, explained in more detail in the examples below, show that molecular/nuclear imaging can be used to effectively measure key physiological properties of the cochlea related to the magnitude of the endocochlear potential which can lead to more effective therapies for hearing loss.

The following non-limiting examples illustrate exemplary methods thereof in accordance with various embodiments of the disclosure. The examples are merely illustrative and are not intended to limit the disclosure in any way.

Example 1—Molecular Imaging of the Inner Ear

For the first time, the inventors demonstrate that state-of-the-art nuclear and molecular imaging techniques can be used to image a key biological function of the inner ear. After in vitro experiments (FIG. 1), the inventors used 201Tl in combination with SPECT-CT techniques to image the mouse cochlea. These novel results demonstrate that the radiotracer ($^{201}$Tl) can enter the bony cochlea, and striking SPECT radiation signals can be measured (FIG. 3), reflecting the physiological properties of the mammalian inner ear. Cochlea radiation signals were much higher than the average brain signals. There was no sex difference in the absorption of $^{201}$Tl (FIG. 4a), and the radiation signals (mean image intensity) from both sides (Left vs Right) also showed no differences i.e., symmetrical absorption of $^{201}$Tl in the peripheral auditory system (FIG. 4b). Ex vivo experimental results, both SPECT imaging and radioactivity measurements (FIG. 6), were consistent with the in vivo findings.

It is widely accepted that the EP arises from an active secretion of $K^+$ into endolymph by the SV[1-3]. At cellular levels, there are reports that 201Tl interacts with ion transporters such as sodium-potassium-ATPase (NKA) and sodium-potassium-chloride co-transporter (NKCCl) that facilitate cochlear $K^+$ exchange[19-22]. Since 201Tl interchanges with $K^+$, it can serve as a radioactive tracer that is actively transported into scala media via these ion transporters. Thus, $^{201}$Tl radiation signals is proportional to the $K^+$ in scala media.

The inventors focus on linking the $^{201}$Tl radiation signal directly to physiological $K^+$, and EP values in the cochlea. Since 201Tl likely acts through NKA and/or NKCCl, blocking these channels by application of specific ion channel blockers and studying the relations between radiation signals and cochlear $K^+$ values, and auditory physiological functionality reveals correlations between radiation signals and EP/$K^+$ values. Ouabain is the specific antagonist for NKA and known to reduce both $K^+$ and EP. Similarly, NKCCl can be blocked using bumetanide[23-26]. Physiological measurements ($K^+$ and EP) in conjunction with imaging experiments with specific drug(s) (such as ouabain and/or bumetanide) protocols reveal the correlations between radiation signals and EP/$K^+$ values.

Results

In Vitro Experiments

First, in vitro phantom experiments were carried out to determine the detectable radiation levels in volumes equivalent to cochlear volumes and estimate the initial radiation doses for in vivo injections. Thallium-chloride (TlCl) solutions with volumes equivalent to inner ear volumes of different animals used in auditory neuroscience research (4 volumes from 3 mammalian species) were used as the phantoms—~0.8 μL—mouse cochlear volume, ~1.2 μL—guinea pig endolymph volume, ~3 μL—rat cochlear volume, and ~10 μL—guinea pig cochlear volume. The TlCl solution was pipetted onto instant thin-layer chromatography (iTLC) paper and placed in an Eppendorf tube and SPECT-CT imaging was performed using the Siemens Inveon® multimodality microPET/SPECT/CT platform (FIGS. 1 a & b). A 0.5 mm mouse brain pin hole collimator was used with a total of 12 projections used to collect the images. SPECT detector calibration conducted according to manufacturer guidelines. $^{201}$Tl specific activity was 1 mCi/ml, with an energy peak observed at 68 keV, and initial radioactivity was measured before carrying out SPECT imaging of phantoms. There was an increase in radioactivity (gamma spectroscopy: ion chamber measurements—FIG. 1c) and SPECT imaging total counts with phantom volumes (FIG. 1d). Total counts from SPECT images were plotted against the radioactivity measured with gamma spectrometry, as a measure of the sensitivity of phantom imaging experiments. Linear regression was fitted between these two parameters (FIG. 1e). As approximate calculations, to get quality SPECT images, the image should be more than 5× the background counts (where radioactivity=0), which is approximately a 400 μCi dose for animal models of equivalent size to the mouse.

In Vivo Experiments

Figure 2:
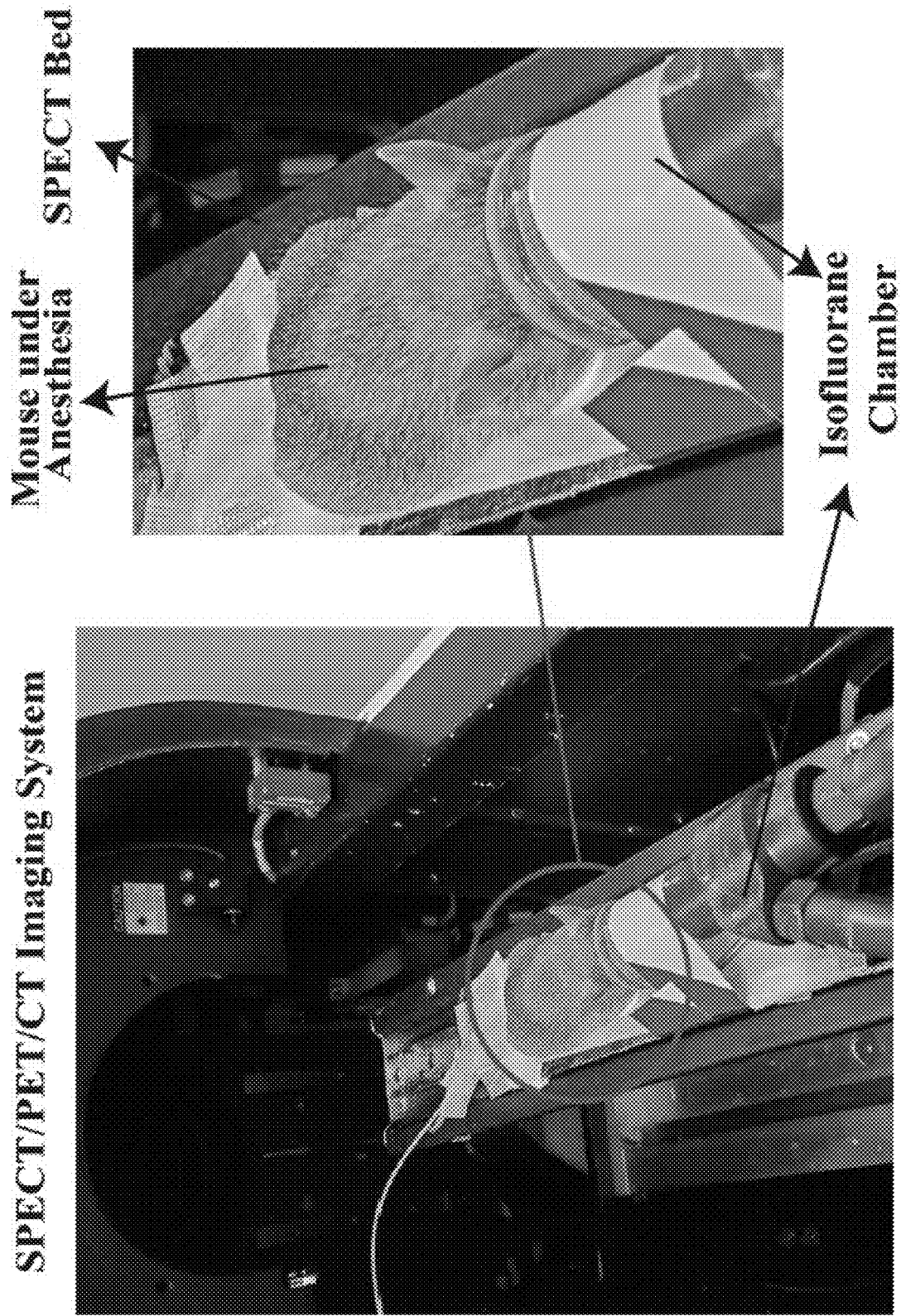
FIG. 2 is a series of images depicting the in vivo experimental set-up. CBA/CaJ mouse injected with $^{201}$Tl intravenously via tail vein and SPECT imaging was done under continuous anesthesia. Figures show a digital micrograph of a CBA/CaJ mouse on SPECT machine (Left). Right image is a zoomed picture of the same.
Figure 3:
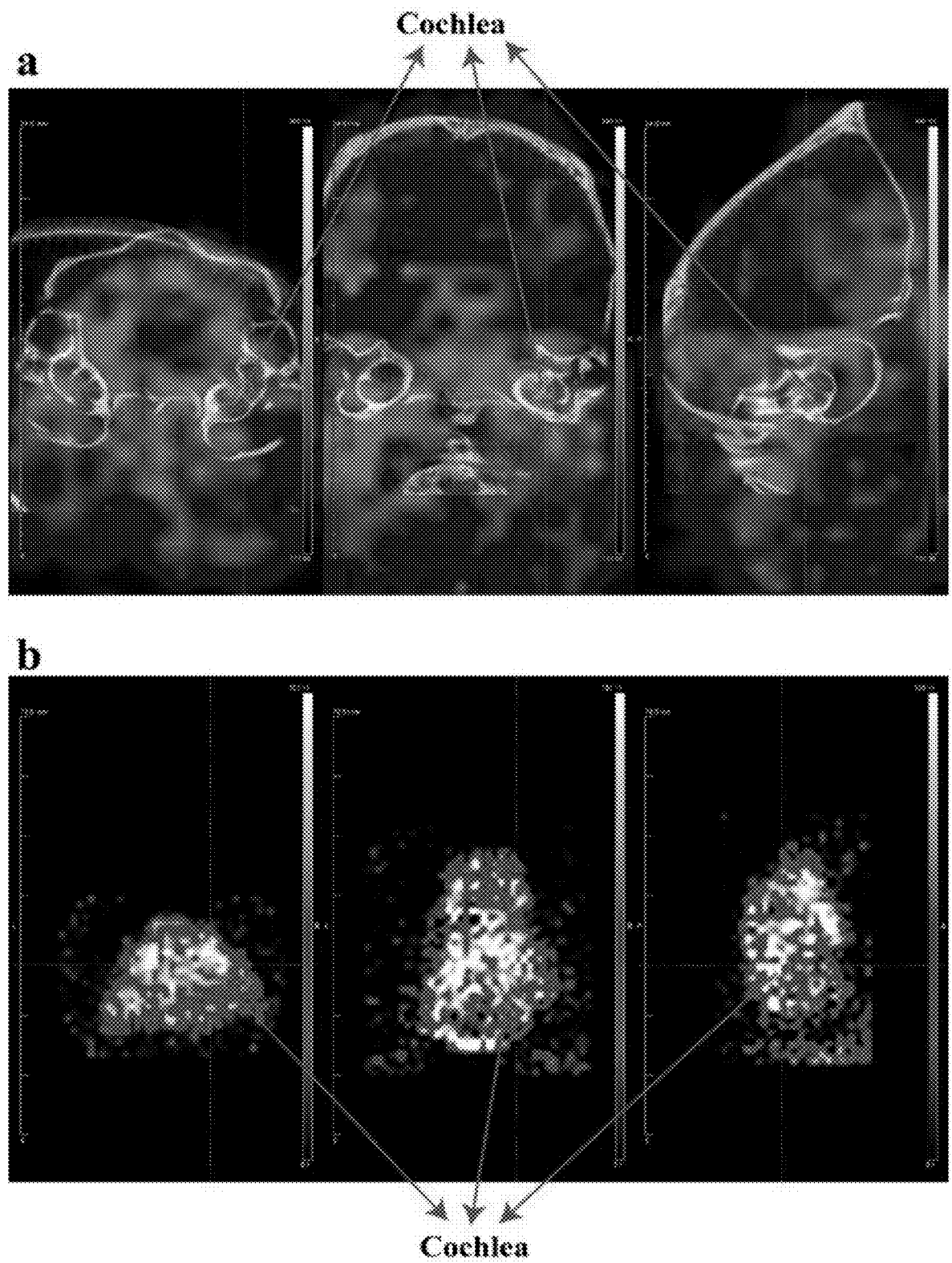
FIG. 3A-B are images depicting SPECT Imaging. The SPECT imaging of a mouse head showed that the $^{201}$Tl signal was present in the cochlea. CT imaging was used for the anatomical referencing. a) Combined CT and SPECT images of the mouse brain in the three planes; left: Axial (Horizontal), Middle: Coronal, and Right: Sagittal. The scale bar is CT signal intensity. b) Corresponding SPECT only image with no CT signal in the same three planes. The scale bar is for SPECT signal intensity.
Figure 4:
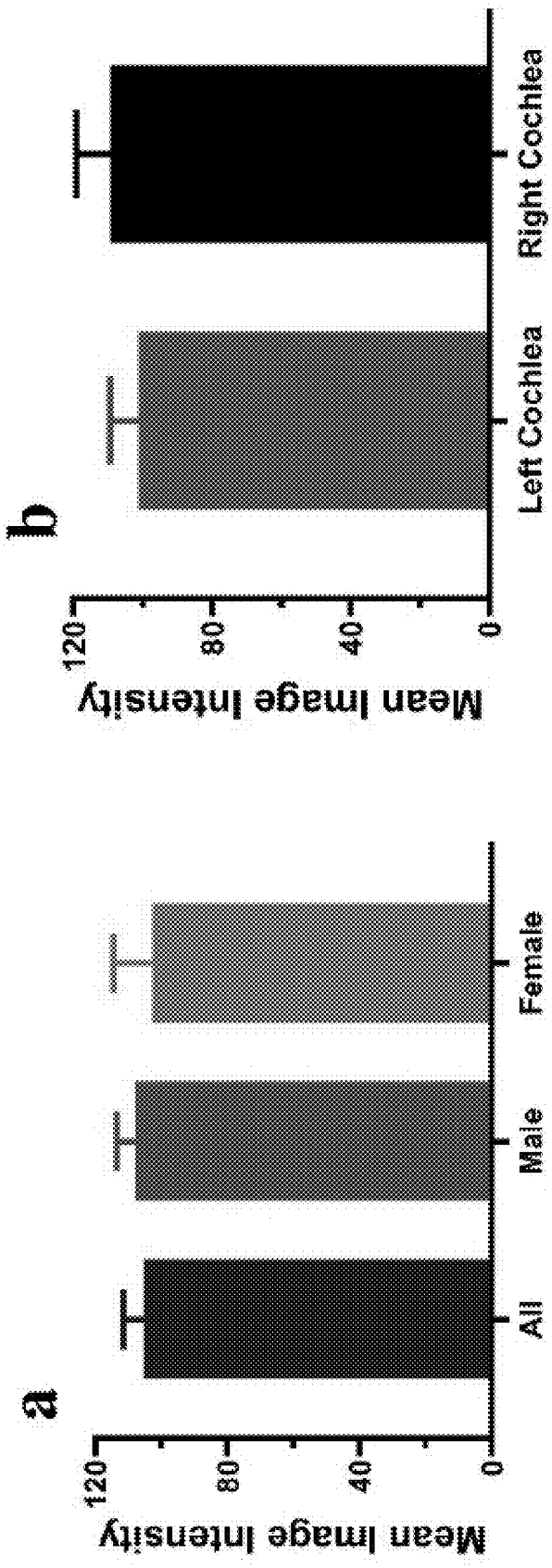
FIG. 4A-B is a series of images depicting quantitative analysis of in-vivo SPECT imaging. a) Mean image intensity of the cochlea of six animals—3 males and 3 females. There were no sex differences. b) Similarly, both right and left cochleae showed no differences in the SPECT $^{201}$Tl signal, indicating equal absorption of radiotracer on both sides.

To test whether or not 201Tl can pass through the cochlear intrastrial fluid blood barrier, so as to image $K^+$ in a bony structure like the cochlea using SPECT techniques, in vivo experiments were performed with CBA/CaJ mice. Young adult mice were injected with TlCl radioactive solution intravenously with a dose of ~400 μCi/animal in the tail vein. The Siemens Inveon® multimodality microPET/SPECT/CT platform was used (mouse brain pinhole collimator with a total of 12 projections) to image the brain, cochlea and whole body. The experimental set up for the in vivo experiments is shown in FIG. 2. CT imaging was also carried out for anatomical referencing. SPECT radiation signals were observed from the cochlea within minutes after the injection-in the first scan. FIG. 3 shows representative SPECT-CT images of the mouse head in the three standard planes—axial, coronal, and sagittal (FIG. 3a—SPECT+CT, Scale bar—CT intensity; FIG. 3b—SPECT only with no CT signal, scale bar-SPECT intensity). The arrow shows the cochlea location, detected with CT referencing. The average cochlear signal was significantly higher than the average brain signal. One animal was imaged for five continuous days, and as expected, the SPECT signal decreased over that time period in the cochlea and other body parts.

Figure 5:
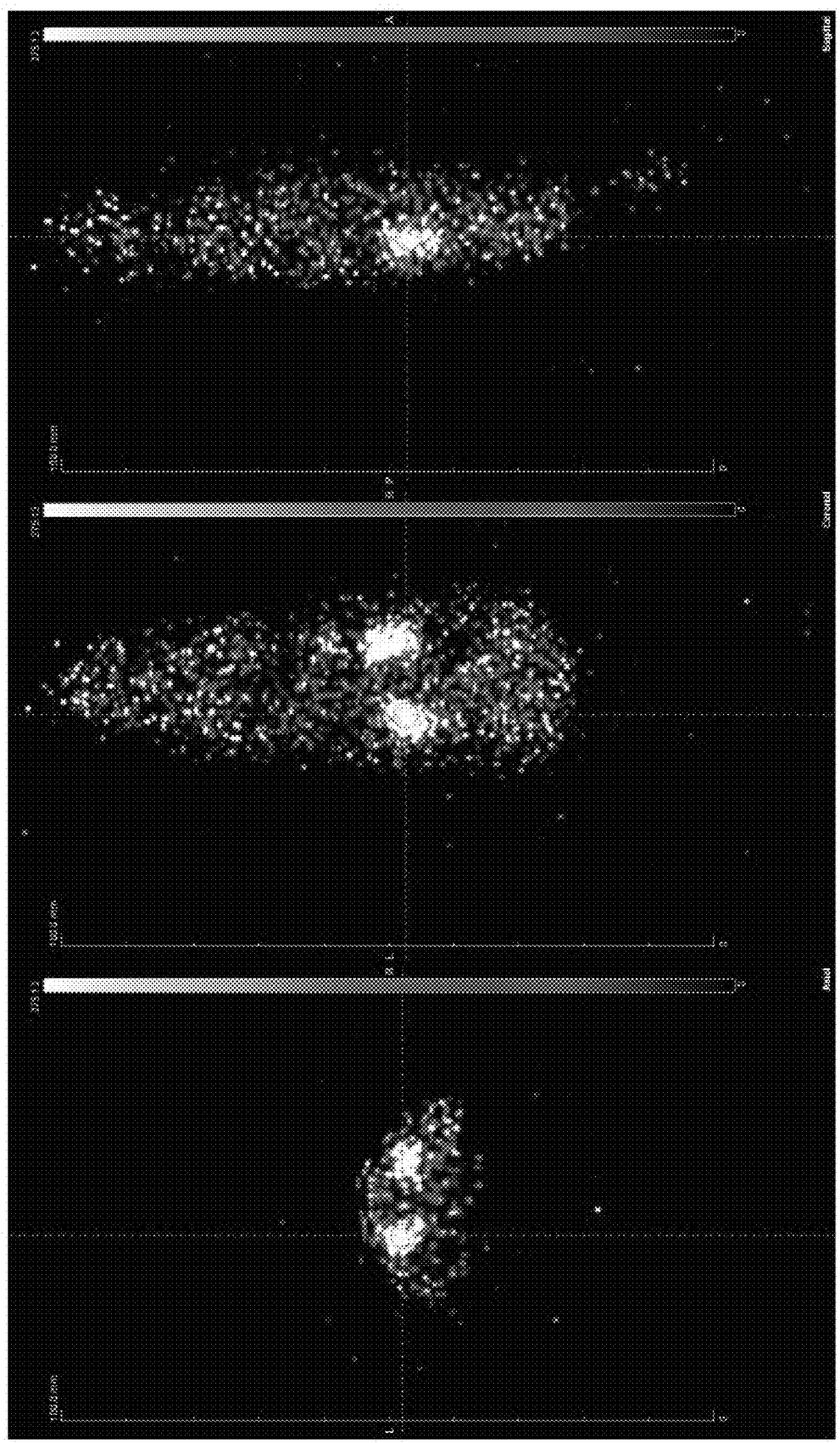
FIG. 5 is a series of images depicting SPECT images of the whole body in three planes—axial, coronal and sagittal. Images clearly shows he maximum accumulation of $^{201}$Tl in the kidney, consistent with the literature.

The region of interest (ROI) was drawn for the cochlea using anatomical images from the CT scans. Quantitative analysis of SPECT images confirmed no sex difference for 201Tl SPECT imaging of the cochlea as shown in FIG. 4a. Similarly, radiation signals (mean image intensity) from the two sides (left and right cochleae) were equal (FIG. 4b), indicating symmetrical absorption of the $^{201}$Tl for the peripheral auditory system (cochlea). SPECT imaging of the whole body showed the maximum accumulation of $^{201}$Tl in the kidney, as expected (FIG. 5). This observation ($^{201}$Tl maximum accumulation in the kidney) was consistent with the reported literature as $^{201}$Tl is known to maximally accumulate there 17,18

Ex Vivo Experiments

For further confirmation, a pair of cochleae from a single mouse were dissected and ex vivo measurements (SPECT-CT image and radioactivity measurements-gamma spectroscopy) were carried out. FIG. 6 shows the experimental set up (FIG. 6a-Two tubes on the SPECT/CT bed, each containing a cochlea) and measurement results from ex vivo experiments. Strong SPECT radiation signals were observed for both cochleae (FIG. 6b-SPECT-CT images of both cochleae, inset on top right shows the SPECT signal only, with no CT). Mean intensity and total photons were calculated from both the cochleae SPECT images. There was no quantitative difference between cochlea 1 and cochlea 2 (FIG. 6c-Mean intensity of ex vivo samples—cochlea 1 vs cochlea 2; FIG. 6d—Total photon of ex vivo samples—Cochlea 1 vs Cochlea 2). Though, as expected, the mean intensity of ex vivo samples were significantly less than in vivo images (Mean intensity FIG. 6c vs FIG. 4). Moreover, energy spectra were measured using a BioDEx ion chamber and both cochleae had the same spectra, with the peak energy around 68 KeV—same as $^{201}$Tl energy peak (FIG. 6e). These ex vivo measurements further confirm the equal distribution of $^{201}$Tl for both inner ears.

In addition, the radiation signal was measured from various body parts, in comparison to the cochlea. The measurements were calculated per gm of tissue (specific activity) to make comparisons among various tissues and specific activities were further normalized with brain specific activity. Since the cochlea has a high K+ concentration (~150 mM in scala media) and $^{201}$Tl exchanges with K$^+$, the cochlea showed the highest signal among most body parts, except kidney (FIG. 6f—ex vivo specific activity measurements).

Materials and Methods

In Vitro Imaging Experiments

SPECT calibration and in vitro Phantom experiments were carried out as per standard procedures and described previously. Briefly, Phantom experiments were performed to find the detectable radiation levels in volumes equivalent to cochlear volumes of different mammals. Instant thin layer chromatography (iTLC) paper in an Eppendorf tube was used as the phantom and imaged using a Siemens Inveon® multimodality microPET/SPECT/CT platform. The ion chamber (BioDex 500} was used to measure the initial radioactivity of each phantom sample before carrying out the SPECT imaging.

In Vivo Imaging Experiments

After baseline phantom in vitro experiments were completed, in vivo imaging experiments were conducted using young adult CBA/CaJ mice (2-3 months old, n=6, 3 females and 3 males) to determine whether 201Tl can pass through the cochlear intrastrial fluid/blood barrier and if the bony cochlea can be imaged using SPECT. Each mouse was injected with approximately 400 µCi $^{201}$Tl radiation into tail veins through a catheter. Similar to the in vitro phantom experiments, a total of 12 projections over a 360 arc were used to collect the images. During the imaging data collection, animals were under gas anesthesia (1-2% isoflurane) in an air-warmed imaging chamber (Harvard Apparatus, Cambridge, MA) to keep body temperature constant at 37° C., and the breathing rate and pattern were continuously monitored. For anatomical referencing of the cochlea, CT imaging was also conducted in conjunction with SPECT. The region of Interest (ROI) was drawn with the help of the CT referencing. Images were reconstructed using maximum-likely-hood expectation maximization (MLEM) algorithm, and finally, 3-D images were reconstructed with scattering and attenuation corrections.

Ex Vivo Experiments

At the end of the imaging session, animals were sacrificed and ex vivo experiments were carried out in which radiation signals were measured from various body regions, including the brain and cochlea. A pair of cochleae were dissected and ex vivo measurements were done using both SPECT-CT imaging as well as radioactivity measurements (BioDex 500 ion chamber; gamma spectroscopy). Images were reconstructed from SPECT-CT data as per the same algorithms and protocols used for the in-vivo experiments.

Conclusion

There are very few clinical options for measuring the exact cause and nature of biological mechanisms underlying different types of hearing impairment. As a result, there are no FDA-approved medical treatments to prevent or reverse sensorineural hearing loss. The inventors have provided novel preclinical results for a first-ever noninvasive measurement of the cochlear EP where the resulting radiation signal is proportional to the magnitude of the EP. The inventors have shown that measurement of the potassium ion concentration is related to the strength of the cochlear battery or EP. These breakthrough findings indicate that nuclear imaging paradigms can open new research/clinical avenues thus leading to novel diagnostic and therapeutic interventions for hearing disorders.

Example 2—Method of Diagnosing and Treating Hearing Loss (Prophetic)

A 49 year old male patient presents with diminished hearing. The patient is administer a therapeutically effective amount of 201Tl as a radiotracer and SPECT imaging is performed on the inner ear. The potassium levels in the cochlea of the patient, as correlated to the radiation signal emitted from the radiotracer in the cochlea, are compared to potassium levels of the cochlea of a normal control. It is noted that the potassium levels of the patient are decreased as compared to the potassium levels of the normal control. The patient is administered a therapeutically effective amount of a therapeutic agent to increase potassium levels in the cochlea. After a period of time, the patient's hearing is improved.

REFERENCES

1. Bazard P, Frisina R D, Acosta A A, et al. Roles of Key Ion Channels and Transport Proteins in Age-Related Hearing Loss. *International Journal of Molecular Sciences*. 2021; 22:6158.
2. Wangemann P. K+ cycling and the endocochlear potential. *Hearing Research*. 2002; 165:1-9.
3. Hudspeth A J. How the ear's works work. *Nature*. 1989; 341:397-404.
4. Schuknecht H F, Gacek M R. Cochlear Pathology in Presbycusis. *Annals of Otology, Rhinology & Laryngology*. 1993; 102:1-16.
5. Gates G A, Mills D, Nam B-h, D'Agostino R, Rubel E W. Effects of age on the distortion product otoacoustic emission growth functions. *Hearing Research*. 2002; 163:53-60.
6. Gates G A, Mills J H. Presbycusis. *The Lancet*. 2005; 366:1111-1120.

7. Li W, Zhao L, Jiang S, Gu R. Effects of high intensity impulse noise on ionic concentrations in cochlear endolymph of the guinea pig. *Chin Med J (Engl)*. 1997; 110:883-886.
8. Ma Y L, Gerhardt K J, Curtis L M, Rybak L P, Whitworth C, Rarey K E. Combined effects of adrenalectomy and noise exposure on compound action potentials, endocochlear potentials and endolymphatic potassium concentrations. *Hearing Research*. 1995; 91:79-86.
9. Bhattacharyya T K, Dayal V S. Age-Related Cochlear Hair Cell Loss in the Chinchilla. *The Annals of otology, rhinology, and laryngology*. 1985; 94:75-80.
10. Bhattacharyya T K, Dayal V S. Influence of age on hair cell loss in the rabbit cochlea. *Hearing Research*. 1989; 40:179-183.
11. Lang H, Schulte B A, Schmiedt R A. Endocochlear Potentials and Compound Action Potential Recovery: Functions in the C57B L/6J Mouse. *Hearing Research*. 2002; 172:118-126.
12. Ohlemiller K K, Dahl A R, Gagnon P M. Divergent Aging Characteristics in CBA/J and CBA/CaJ Mouse Cochleae. *Journal of the Association for Research in Otolaryngology*. 2010; 11:605-623.
13. Pike V W. PET Radiotracers: Crossing the Blood-Brain Barrier and Surviving Metabolism. *Trends in Pharmacological Sciences*. 2009; 30:431-440.
14. Krahwinkel W, Herzog H, Feinendegen L E. Pharmacokinetics of Thallium-201 in Normal Individuals After Routine Myocardial Scintigraphy. *The Journal of Nuclear Medicine*. 1988; 29:1582-1586.
15. Manabe O, Kikuchi T, Scholte AJHA, et al. Radiopharmaceutical Tracers for Cardiac Imaging. *Journal of Nuclear Cardiology*. 2018; 25:1204-1236.
16. Strauss H W, Harrison K, Langan J K, Lebowitz E, Pitt B. Thallium-201 for Myocardial Imaging. Relation of Thallium-201 to Regional Myocardial Perfusion. *Circulation*. 1975; 51:641-645.
17. Atkins H L, Budinger T F, Lebowitz E, et al. Thallium-201 for Medical Use. Part 3: Human Distribution and Physical Imaging Properties. *Journal of Nuclear Medicine*. 1977; 18:133-140.
18. Washiyama K, Shiga H, Hirota K, et al. Biological safety of nasal thallium-201 administration: a preclinical study for olfacto-scintigraphy. *Journal of Radiation Research*. 2011; 52:450-455.
19. Demir H. Thallium-201 Imaging. In: Kretsinger R H, Uversky V N, Permyakov E A, eds. *Encyclopedia of Metalloproteins*. New York, N Y: Springer New York; 2013:2203-2212.
20. Schmalhofer W A, Swensen A M, Thomas B S, et al. A Pharmacologically Validated, High-Capacity, Functional Thallium Flux Assay for the Human Ether-à-go-go Related Gene Potassium Channel. *Assay and Drug Development Technologies*. 2010; 8:714-726.
21. Zhang D, Gopalakrishnan S M, Freiberg G, Surowy C S. A Thallium Transport FLIPR-Based Assay for the Identification of KCC2-Positive Modulators. *Journal of Biomolecular Screening*. 2010; 15:177-184.
22. Ding B, Frisina R D, Zhu X, Sakai Y, Sokolowski B, Walton J P. Direct control of Na+-K+-2Cl−—cotransport protein (NKCCl) expression with aldosterone. *American Journal of Physiology—Cell Physiology*. 2014; 306: C66-C75.
23. Nin F, Hibino H, Doi K, Suzuki T, Hisa Y, Kurachi Y. The endocochlear potential depends on two K+ diffusion potentials and an electrical barrier in the stria vascularis of the inner ear. *Proceedings of National Academy of Sciences*. 2008; 105:1751-1756.
24. Schmiedt R, Okamura H-O, Lang H, Schulte B. Ouabain application to the round window of the gerbil cochlea: a model of auditory neuropathy and apoptosis. *Journal of the Association for Research in Otolaryngology*. 2002; 3:223-233.
25. Higashiyama K, Takeuchi S, Azuma H, et al. Bumetanide-induced enlargement of the intercellular space in the stria vascularis critically depends on Na+ transport. *Hearing Research*. 2003; 186:1-9
26. Kusakari J, Kambayashi J, Ise I, Kawamoto K. Reduction of the Endocochlear Potential by the New "Loop" Diuretic, Bumetanide. *Acta Oto-Laryngologica*. 1978; 86:336-341.

The disclosures of all publications cited above are expressly incorporated herein by reference, each in its entirety, to the same extent as if each were incorporated by reference individually.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of measuring endocochlear potential (EP) in a patient in need thereof comprising:
    administering a therapeutically effective amount of at least one radiotracer to a patient;
    performing nuclear imaging on cochlea of the patient;
    measuring a level of radiation signals emitting from the at least one radiotracer wherein the level of the radiation signals are proportional to a level of potassium or sodium ion concentration in the cochlea of the patient; and
    comparing the level of the potassium or the sodium ion concentration in the cochlea of the patient as measured by the radiation signals to a level of potassium or sodium ion concentration of a normal control;
    wherein a decrease in the level of the potassium ion concentration or an increase in the level of the sodium ion concentration in the cochlea of the patient as measured by the radiation signals as compared to the level of the potassium ion concentration or the sodium ion concentration in the normal control indicates a decrease in EP.

2. The method of claim 1, further comprising administering a therapeutic agent to increase potassium ion concentration levels in the cochlea.

3. The method of claim 1, further comprising administering aldosterone or derivatives thereof to the patient.

4. The method of claim 1, wherein the nuclear imaging is positron emission tomography (PET), magnetic resonance imaging (MRI), or single-photon emission computerized tomography (SPECT).

5. The method of claim 1, wherein the radiotracer is a potassium analog, a sodium analog, or combinations thereof.

6. The method of claim 1, wherein the radiotracer is selected from the group consisting of thallium-201 ($^{201}$Tl), rubidium-82 ($^{82}$Rb), potassium-43 ($^{43}$K$^+$), rubidium-86 ($^{86}$Rb), sodium-22 ($^{22}$Na), and cesium-129 ($^{129}$Cs).

7. The method of claim 6, wherein the radiotracer is thallium-201 ($^{201}$Tl).

8. A method of determining cochlear function in a patient comprising:

administering a therapeutically effective amount of at least one radiotracer to the patient wherein the at least one radiotracer is a potassium analog, a sodium analog, or a combination thereof;

performing a nuclear imaging procedure on the cochlea of the patient;

measuring a level of radiation signals emitting from the at least one radiotracer wherein the level of the radiation signals measured in the cochlea of the patient are proportional to a level of potassium ion concentration or a level of sodium ion concentration in the cochlea of the patient; and comparing the level of potassium ion concentration or the level of sodium ion concentration in the cochlea of the patient as measured by the radiation signals to a level of potassium ion concentration or a level of sodium ion concentration of a normal control;

wherein a decrease in the level of the potassium ion concentration or an increase in the level of the sodium ion concentration in the cochlea of the patient as measured by the radiation signals as compared to the level of the potassium ion concentration or the sodium ion concentration in the normal control indicates a decrease in cochlear function.

9. The method of claim 8, further comprising administering a therapeutic agent to increase potassium ion concentration levels in the cochlea.

10. The method of claim 8, further comprising administering aldosterone or derivatives thereof to the patient.

11. The method of claim 8, wherein the nuclear imaging is positron emission tomography (PET), magnetic resonance imaging (MRI), or single-photon emission computerized tomography (SPECT).

12. The method of claim 8, wherein the radiotracer is selected from the group consisting of thallium-201 (201Tl), rubidium-82 ($^{82}$Rb), potassium-43 (43K$^+$), rubidium-86 ($^{86}$Rb), sodium-22 ($^{22}$Na), and cesium-129 (129Cs).

13. The method of claim 12, wherein the radiotracer is thallium-201 (201Tl).

14. A method of diagnosing and treating an auditory disorder in a patient comprising:

administering a therapeutically effective amount of at least one radiotracer to a patient;

performing a nuclear imaging procedure on an inner ear of the patient;

measuring a level of radiation signals emitting from the at least one radiotracer wherein the level of the radiation signals measured in the inner ear of the patient correlates to a level of potassium ion concentration in a cochlea of the inner ear of the patient;

comparing the level of the potassium ion concentration in the inner ear of the patient as measured by the radiation signals to a level of potassium ion concentration of a normal control wherein a decrease in the level of the potassium ion concentration in the inner ear of the patient as compared to the normal control indicates an auditory disorder; and administering a therapeutically effective amount of a therapeutic agent to the patient wherein the therapeutic agent increases the level of potassium ion concentration in the inner ear of the patient.

15. The method of claim 14, wherein the therapeutic agent is aldosterone or derivatives thereof.

16. The method of claim 14, wherein the nuclear imaging is positron emission tomography (PET), magnetic resonance imaging (MRI), or single-photon emission computerized tomography (SPECT).

17. The method of claim 14, wherein the radiotracer is a potassium analog, a sodium analog, or combinations thereof.

18. The method of claim 14, wherein the radiotracer is selected from the group consisting of thallium-201 ($^{201}$Tl), rubidium-82 ($^{82}$Rb), potassium-43 (43K$^+$), rubidium-86 ($^{86}$Rb), sodium-22 ($^{22}$Na), and cesium-129 ($^{129}$Cs).

19. The method of claim 18, wherein the radiotracer is thallium-201 (201Tl).

* * * * *